United States Patent
Moraghan et al.

(10) Patent No.: US 11,917,243 B1
(45) Date of Patent: *Feb. 27, 2024

(54) OPTIMIZING INVENTORY BASED ON PREDICTED VIEWERSHIP

(71) Applicant: CSC Holdings, LLC, Bethpage, NY (US)

(72) Inventors: Colleen Moraghan, Cold Spring Harbor, NY (US); Nandhita Karunanithi, West Windsor, NJ (US)

(73) Assignee: CSC Holdings, LLC, Bethpage, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/921,259

(22) Filed: Jul. 6, 2020

Related U.S. Application Data

(63) Continuation of application No. 13/833,293, filed on Mar. 15, 2013, now Pat. No. 10,708,654.

(51) Int. Cl.
 *H04N 21/442* (2011.01)
 *G06Q 30/0241* (2023.01)
 *G06Q 30/0251* (2023.01)
 *G06Q 30/0242* (2023.01)

(52) U.S. Cl.
 CPC ... *H04N 21/44222* (2013.01); *G06Q 30/0241* (2013.01); *G06Q 30/0244* (2013.01); *G06Q 30/0264* (2013.01); *G06Q 30/0277* (2013.01)

(58) Field of Classification Search
 CPC ......... H04N 21/44222; G06Q 30/0241; G06Q 30/0244; G06Q 30/0264; G06Q 30/0277; G06Q 30/0251; G06Q 30/0254; G06Q 30/0255

USPC ........ 705/14.43, 7.29, 7.31; 463/42; 725/23, 725/9; 348/E7.071
See application file for complete search history.

(56) References Cited

U.S. PATENT DOCUMENTS

| | | | |
|---|---|---|---|
| 6,530,082 B1 | 3/2003 | Del Sesto et al. | |
| 6,983,478 B1 | 1/2006 | Grauch et al. | |
| 7,392,157 B1 * | 6/2008 | Delurgio ................ | G06Q 10/04 702/187 |
| 7,444,655 B2 | 10/2008 | Sardera | |
| 7,729,940 B2 | 6/2010 | Harvet et al. | |
| 7,853,474 B2 | 12/2010 | Ullah | |
| 7,890,299 B2 | 2/2011 | Fok et al. | |
| 8,065,698 B2 | 11/2011 | Glasgow et al. | |

(Continued)

OTHER PUBLICATIONS

Manish Bhatia, The Promise and Perils of Set Top Box Data, 2009 (Year: 2009).*

(Continued)

*Primary Examiner* — Tarek Elchanti
(74) *Attorney, Agent, or Firm* — Sterne, Kessler, Goldstein & Fox P.L.L.C.

(57) ABSTRACT

In a video delivery context, collection and analysis of viewing data can provide insight into viewer interaction with video and the Internet. The viewing data can be transmitted in a controlled manner to a data repository. Disclosed herein are system, method, and computer program product embodiments for optimizing inventory based on predicted viewership. An example embodiment operates by evaluating past viewership data for a periodic event, determining a tendency of a market segment to view the periodic event, and predicting viewership for a future event based on the determined tendency.

20 Claims, 10 Drawing Sheets

(56) References Cited

U.S. PATENT DOCUMENTS

| | | |
|---|---|---|
| 8,549,561 B2 | 10/2013 | Yeh et al. |
| 9,071,370 B2 | 6/2015 | Toner et al. |
| 9,635,402 B1 | 4/2017 | Toner et al. |
| 9,877,052 B1 | 1/2018 | Toner et al. |
| 10,708,654 B1 | 7/2020 | Toner et al. |
| 2002/0129368 A1 | 9/2002 | Schlack et al. |
| 2002/0144262 A1* | 10/2002 | Plotnick ............... H04N 21/458 348/E7.071 |
| 2002/0169657 A1* | 11/2002 | Singh ................. G06Q 30/0202 705/7.31 |
| 2003/0093792 A1 | 5/2003 | Labeeb et al. |
| 2003/0145323 A1 | 7/2003 | Hendricks et al. |
| 2003/0188308 A1 | 10/2003 | Kizuka |
| 2003/0229892 A1 | 12/2003 | Sardera |
| 2005/0278731 A1 | 12/2005 | Cameron et al. |
| 2007/0136753 A1* | 6/2007 | Bovenschulte .. H04N 21/44224 348/E7.071 |
| 2007/0157247 A1 | 7/2007 | Cordray et al. |
| 2007/0214470 A1 | 9/2007 | Glasgow et al. |
| 2007/0271580 A1 | 11/2007 | Tischer et al. |
| 2008/0040742 A1 | 2/2008 | Howcroft et al. |
| 2008/0109284 A1 | 5/2008 | Slaney et al. |
| 2008/0248815 A1 | 10/2008 | Busch |
| 2008/0254889 A1* | 10/2008 | Sispoidis ............ G06Q 30/0202 463/42 |
| 2008/0263578 A1* | 10/2008 | Bayer ................ G06Q 30/0264 725/23 |
| 2008/0294384 A1 | 11/2008 | Fok et al. |
| 2009/0150224 A1* | 6/2009 | Lu ...................... G06Q 30/0202 705/7.29 |
| 2009/0150778 A1* | 6/2009 | Nicol, II ................. A63F 13/45 715/706 |
| 2009/0193485 A1 | 7/2009 | Rieger et al. |
| 2010/0333125 A1 | 12/2010 | Eldering et al. |
| 2011/0153208 A1 | 6/2011 | Kruglick |
| 2011/0289524 A1* | 11/2011 | Toner ............... H04N 21/44204 725/9 |
| 2012/0331494 A1 | 12/2012 | Pomtual et al. |
| 2013/0019009 A1 | 1/2013 | Tremblay et al. |
| 2014/0109123 A1 | 4/2014 | Balakrishnan et al. |
| 2017/0344220 A1* | 11/2017 | Cook ....................... G06T 19/00 |
| 2018/0315254 A1* | 11/2018 | Grant ...................... G06T 13/40 |
| 2022/0070232 A1* | 3/2022 | Young ................. G06Q 10/107 |

OTHER PUBLICATIONS

U.S. Appl. No. 15/864,654, filed Jan. 8, 2018, entitled "System and Method for Set Top Box Viewing Data".

* cited by examiner

FIG. 10

OPTIMIZING INVENTORY BASED ON PREDICTED VIEWERSHIP

CROSS-REFERENCE TO RELATED APPLICATIONS

This application is a continuation of U.S. patent application Ser. No. 13/833,293, filed Mar. 15, 2013, now U.S. Pat. No. 10,708,654, which is incorporated herein by reference in its entirety.

BACKGROUND

Field of the Invention

Embodiments relate generally to television or other video programming viewing data received from a set top box, and more particularly to handling of such viewing data including collection, transmission, storage, analysis, modification, and application of the viewing data.

Background Art

A set top box, or STB, is generally deployed at a viewer's household or business (customer premise) to provide the viewer with the ability to control delivery of video programming from a provider. The viewer can issue control commands to the STB, for example, powering on the STB, tuning to a specific channel, and tuning to other specific channels over time. A customer can also send and receive data to and from the provider, for example, via an Internet connection. A viewer may simultaneously, but separately, interact with the Internet and video programming. For example, the viewer can access the Internet in response to video programming, either separately through a PC, or perhaps through a browser-enabled STB.

Conventional viewing data collection systems are limited in a number of ways: either in the number of viewers, in the number of viewer control events, or even excluding simultaneous or related Internet activity. Viewing data collection is typically limited to a particular set of target households, sampled at limited intervals.

BRIEF SUMMARY

Embodiments described herein include various computer implemented method, system, and computer program product embodiments, and combinations and sub-combinations thereof, for optimizing inventory based on predicted viewership. In an example embodiment, optimizing inventory based on predicted viewership includes evaluating past viewership data for a periodic event, determining a tendency of a market segment to view the periodic event, and predicting viewership for a future event based on the determined tendency.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings:

FIG. 10 is a screen-shot of a user interface for displaying and interacting with information, according to an embodiment.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Collection and analysis of viewing data can provide a flexible, configurable, scalable method to capture STB and Internet events, and transmit the viewing data in a controlled manner to a database repository, e.g., a data warehouse, head-end based repository, or the like. The system can target specific viewers/households to obtain viewing data including Internet and STB usage, and can anonymize and encrypt the viewing data. The system has flexibility in controlling how and when collected viewing data is transferred to a repository, preventing spikes in network traffic.

Arrangements can collect anonymous viewing data from a sample of households. The sample configuration can be chosen randomly or according to preselected criteria. The collected viewing data can be combined with sales, demographic and sociographic characteristics of the households, while maintaining the anonymity of the viewing households. Accordingly, the arrangement provides a very detailed understanding of viewing patterns, including television programming, commercials, and Internet usage, while maintaining anonymity. The data is available for use on a near real-time basis.

The specific illustrations and embodiments are described with respect to a STB and/or television in connection with data within a service-provider managed network. Embodiments also can be applied to various platforms including personal computers, cellular telephones, personal digital assistants (PDAs), tablets (e.g., Apple® iPad™), and other mobile devices, Internet Protocol (IP)-based telephones using voice over IP (VOIP), digital video recorders (DVRs), remote-storage DVRs, video on-demand (VOD) systems, interactive TV systems, and other systems capable of receiving and displaying video and/or utilizing a network connection such as the Internet. References to a STB should therefore be interpreted to include these and other similar systems involving display of video and viewer input.

Collection and Storage of Viewing Data

Figure 1:
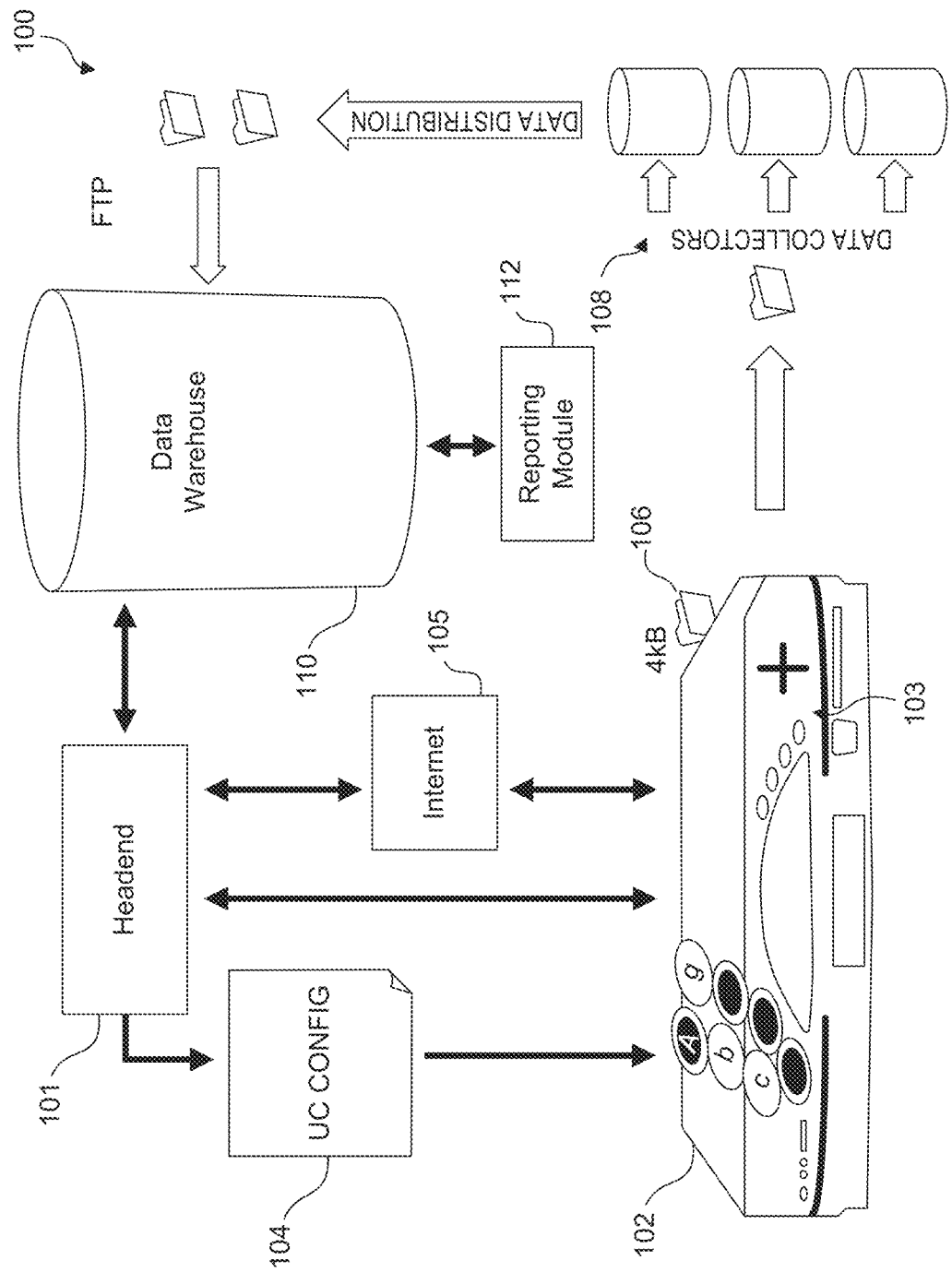
FIG. 1 is a block diagram of an architecture of a video and Internet system including collection of viewing data according to an embodiment.

FIG. 1 illustrates a block diagram of an architecture of a video system 100 including collection of viewing data from within a service-provider managed network according to an embodiment. Video system 100 includes STB 102. Exemplary STB 102 can include, without limitation, an Internet Protocol (IP)-based (i.e., IPTV) STB. Embodiments are not limited to this exemplary STB, and it would be apparent to those skilled in the art that other STBs can be used in embodiments described herein, including personal computers. Many additional STBs can be used with the system 100, although only STB 102 is illustrated in FIG. 1. A network-connected device separate from STB 102, such as a personal computer, can be connected to the Internet 105, although not specifically illustrated. Accordingly, the headend 101 can receive and monitor viewing data associated with viewer interaction with the Internet 105 or video programming. STB 102 can also interact with viewing data.

STB 102 is configured to interact with media including receiving video broadcast and the Internet 105 from headend 101. The STB 102 receives operational commands from a viewer, including tuning actions. A remote control (not shown) may be used to control operation of STB 102. Some set-top boxes may have controls 103 thereon not requiring the use of a remote control. The remote control is configured with buttons to control the STB 106, including play, pause, stop, etc.

The STB 102 can be configured to receive usage collection configuration information (UC Config 104). As illustrated, UC Config 104 is sent from the headend 101, although UC Config 104 can be sent from alternate sources, e.g., via the Internet, and UC Config 104 can be stored on and updated at the STB 102. The STB 102 can also be programmed to implement tools used for capturing viewing activity. STB 102 can receive updates to re-program the STB 102 and associated tools.

UC Config 104 can instruct the STB 102 to selectively collect, store, and send viewing data 106. Programming information associated with video broadcasts received from headend 101 can be included in viewing data 106. Programming information can include, for example, a name of a broadcast program or promotional spot/advertisement, along with other identifying information. Viewing data 106 can also include operational commands from the viewer. Viewing data 106 can be associated with a household, and can include an anonymous tracking number corresponding to the household, specific equipment used, the date and time in seconds, the channel tuned, and the duration in seconds of the viewing of that channel before the channel was changed or the STB 102 was powered off.

Viewing data 106 can be collected without specific programming information such as the name of programming and advertisements/promos. Excluding such data can reduce the total amount of viewing data stored, transmitted, etc. The specific programming information can be recovered by combining viewing data 106 with, for example, program content logs and as-run advertising logs. The specific programming information is accurately correlated with the viewing data 106 based on, for example, timestamps included in the viewing data 106 and the logs.

Viewing data 106 can include additional data. For example, viewing data 106 can include interaction with Internet 105. Headend 101 controls access to Internet 105, and can therefore monitor viewer interaction over Internet 105 for storage with viewing data 106. Alternatively, STB 102 can store viewing data 106 associated with viewer interaction with the Internet 105. It is also contemplated that specific Internet connected devices, separate from STB 102, can report viewing data 106 to the headend 101, STB 102, data collectors 108, etc. along with timestamp information that can be used to correlate the Internet activity.

In one embodiment, information about household members can be collected and stored, for example at the head end or other repository. Information can include, without limitation, name, address (including zip code), and age. Other demographic and/or geographic information can also be collected. Alternatively, a third party can provide data. Also, information such as brand/type/model of television, phone, computer, PDA, mobile device, etc. could also be collected. This information can then be associated with viewing data. However, the data can be made anonymous (e.g., removing specifically identifying information).

STB 102 can be instructed to collect viewing data 106 continuously over time. STB 102 can also be instructed to collect viewing data at intervals, or at specific times associated with a change in any parameter including changes in viewing data, programming, promotional spots, advertisements, and overlays.

For example, video programming from headend 101 can include interactive overlays. Overlays can include promotional information such as a link to a website. Because the video system 100 includes monitoring of Internet 105, it is possible to collect data including a viewer's interaction with Internet 105. Internet interaction data can be stored along with viewing data 106, and can also be maintained separately along with timestamps for correlating the data over time.

STB 102 can be instructed to collect viewing data 106 associated with events. For example, the STB 102 can collect a sampling of viewing data 106 continuously or with the passage of time, e.g., every second. The term continuous is used herein to mean substantially uninterrupted. The term periodically means more often than on the half-an-hour. This allows a more granular view of the viewing habit of a sample audience. Additionally, the STB 102 can collect viewing data 106 when the STB 102 receives an operational command from the viewer, or when Internet activity is detected. The STB 102 can also collect viewing data 106 associated with a change in video broadcast programming. For example, the STB 102 can collect first viewing data 106 upon receiving an operational command to tune to a specific broadcast channel, second viewing data 106 associated with a first commercial break on the tuned channel, third viewing data 106 associated with tuning to a different channel, fourth viewing data 106 associated with tuning back to the original channel, and fifth viewing data 106 associated with Internet activity. Events can be associated with a high priority, to ensure that collecting viewing data 106 is triggered by the occurrence of a high priority event. Each data collection includes a timestamp, which can be used to correlate the data collection and also identify an amount of time spent on an activity relative to the prior or next data collection (including turning off the STB 102).

The STB 102 can be configured to include a dwelling time associated with a duration of an activity, e.g., a duration that the STB 102 has been tuned to a channel. The dwelling time can be used as a factor in determining a granularity associated with whether to collect viewing data. For example, the STB 102 can be configured to include a dwelling time of 10 seconds, such that viewing data 106 is recorded only for events equal to or greater than 10 seconds in duration. Accordingly, the STB 102 can exclude "channel surfing" sessions wherein a viewer rapidly tunes through a series of channels, spending less than the dwelling time (e.g., 10 seconds) viewing each channel. Accordingly, the STB 102 can conserve resources by storing viewing data that is more likely to reflect attentive viewing and not merely channel surfing. However, the STB 102 can record all events continuously, and can utilize data compression to reduce system storage and transmission loads, regardless of whether "channel surfing" data is included.

The STB 102 can store the viewing data 106 in a format referred to as usage collection data events (UC Data), although many additional formats can be used with the system 100. The system 100 can utilize compression and record splitting, for example, to improve transmission and storage efficiency.

Viewing data 106 can also include information regarding the type of equipment used by the viewer. For example, viewing data 106 can identify the specific STB equipment, such as a brand and model of STB 102, including whether STB 102 is digital or IP-based. Although not specifically illustrated, the system 100 can include a personal computer or the like, configured to interact with the Internet 105, receive video broadcast from headend 101, or interact with a viewer for video control and display. Such devices can include cellular telephones, tablet computers, or other devices configured to interact with a network or the Internet 105. Accordingly, the personal computer can collect, store, send, and otherwise interact with viewing data 106 and Internet 105 as would the STB 102. Headend 101 controls the data connection for Internet 105, and therefore can monitor the Internet activity for a household or individual viewer.

Such viewing and Internet activity can include activity initiated on a viewer's cellular telephone. For example, a cellular telephone can interact with the Internet using a wireless Internet Protocol (IP)-based connection, e.g., IEEE 802.11 wireless local area network (WLAN) computer communication ("WIFI"). Also, a household can include a wireless cellular network extender that utilizes the Internet 105 and allows cellular telephones to connect via their native wireless cellular connection. Embodiments can also include Internet Protocol (IP)-based telephones using voice over IP (VOIP). Accordingly, video system 100 can monitor many types of Internet activity at the household.

The system 100 can include very specific, individualized monitoring and data collection. For example, viewers can be associated with a unique identification (ID) or login. Examples of unique IDs include biometrics such as fingerprint, retina scan, or the like, text-based logins/passwords, radio-frequency identification (RFID), cellular telephone-based identification, or the like. The STB 102 can include readers for monitoring and accepting such individual, unique IDs from each viewer. System 100 can also implement customizable icons or avatars associated with each unique ID, as well as the entire family or household, to encourage viewers to login and utilize the unique IDs.

It is also contemplated that data associated with viewer equipment will be associated with the viewer data 106. For example, the fact that multiple viewers access the Internet 105 via an Apple® computer after viewing a commercial might suggest that an advertisement for Apple® would be appropriate for this time slot.

Viewing data 106 can be maintained anonymously. For example, viewing data 106 can be collected without reference to metrics that can be used to specifically identify a viewer or a household, such as an Internet Protocol (IP) number assigned to the household and associated with an account maintained by a resident at the household. Alternatively, all aspects of viewing data 106 can be collected, and specifically identifying metrics can be removed for anonymity.

Viewing data 106 can be stored at the STB 102 prior to transmission to data warehouse 110. Accordingly, network traffic can be managed by varying the transmission of viewing data 106. UC Config 104 can instruct the STB 102 to selectively transmit the viewing data 106 to data collectors 108. STB 102 can selectively transmit the viewing data 106 based on various factors, such as the factors used for selective collection of viewing data 106 as set forth above. For example, viewing data 106 can be transmitted once per day, at random times. It can also be sent periodically during the day (e.g., every half-an-hour) and/or sent at more- or less-frequent intervals. Viewing data 106 can be transmitted when a threshold amount of viewing data 106 has been collected, when a storage buffer of the STB 102 reaches a specified capacity, and/or when a transmission triggering event occurs. The threshold, specified capacity, and/or event can be adjusted independently of specific hardware configurations. Data collectors 108 can distribute the viewing data 106 to data warehouse 110. As illustrated, data warehouse 110 can be in communication with headend 101, such that headend 101 can interact with and monitor viewing data 106 stored at data warehouse 110. Headend 101 can serve as a temporary collection point, that then moves data to a data warehouse where it is combined with other source data to create a rich profile of customer interactions.

Reporting and analysis can be performed on the enriched, combined data. As illustrated, reporting module 112 can be in communication with data warehouse 110 to provide various reports based on viewing data 106 at data warehouse 110. Although one reporting module 112 is shown, multiple reporting modules can be provided in communication with various components of video system 100.

The data transmitted from STB 102 to the headend 101 may be encrypted prior to transmission for security purposes. The data transmitted from STB to the headend could then be made anonymous prior to encryption and transmission.

Viewing data 106 can be identified by attribute and category. Such identifications can relate to measurable aspects of viewing data 106, and can also relate to aspects of viewing data 106 that are determined by analysis (performed remotely and/or by the STB).

Figure 2:
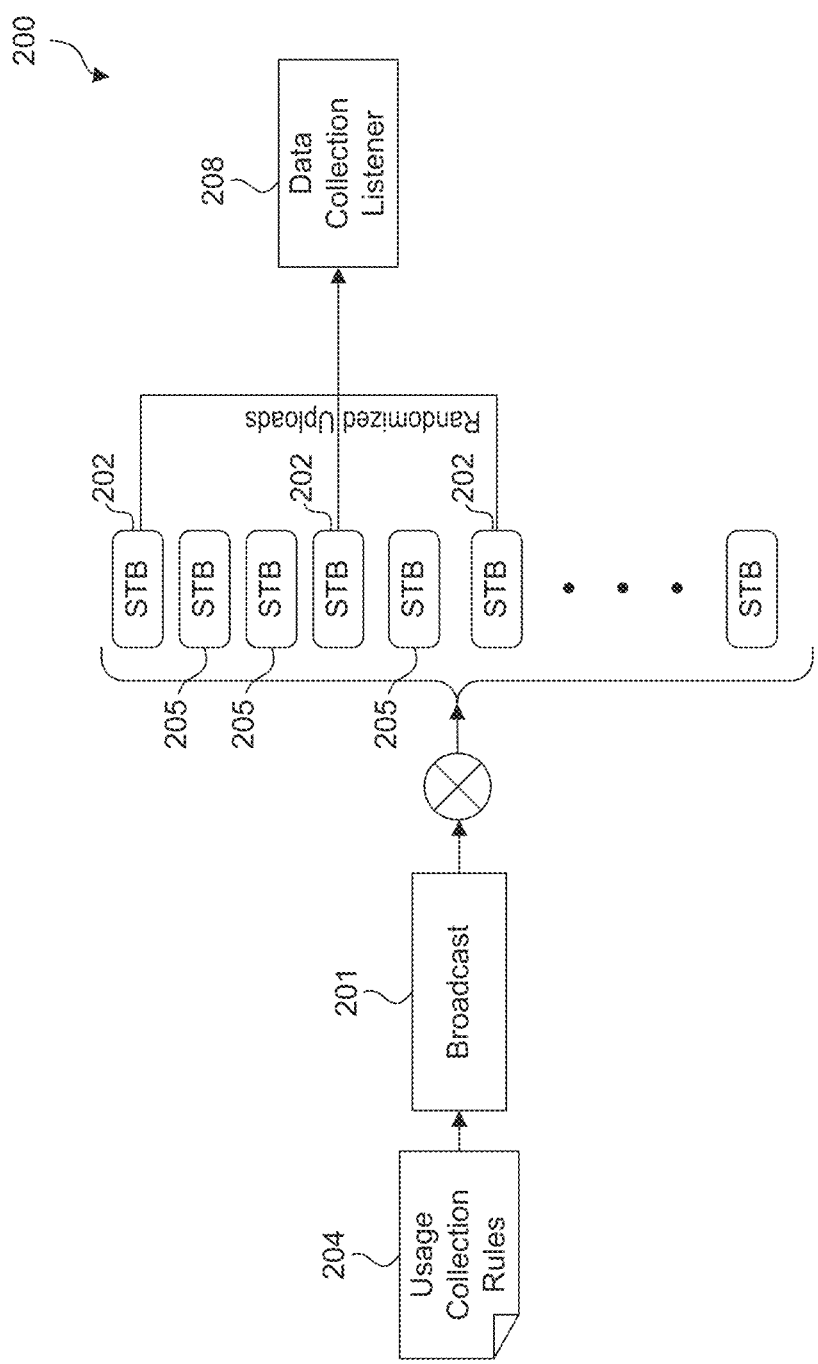
FIG. 2 is a block diagram of an architecture of a video system including randomized upload of viewing data according to an embodiment.

FIG. 2 illustrates a block diagram of an architecture of a video system 200 including randomized upload of viewing data from within a service-provider managed network according to an embodiment. System 200 includes headend 201 configured to broadcast to STBs 202 and 205 associated with households. For example, system 200 can involve a sample of more than 50,000 STBs 202 and 205 from which viewing data can be collected.

A benefit of embodiments described herein is that arrangements can involve changeable sample sizes and selection. Accordingly, a sample can be changed for various reasons. For example, if a particular demographic (e.g., age and household income) is not reflected in the sample, the sample can be changed to target that specific demographic. Additionally, the sample can be increased, to bring in more variety of household compositions and presumably include the target demographic in the increased sample. Because headend 201 broadcasts to a large number of households, any of those households, including all the households, can be included. Selective targeting of STBs 202 and 205 provides improved accuracy and precision, valuable for promotional and advertising purposes.

Headend 201 can broadcast usage collection rules 204 to the STBs 202 and 205. Usage collection rules 204 are evaluated by the STBs 202 and 205, and include rules regarding whether an STB should participate in data collection and/or upload activity. FIG. 2 illustrates headend 201 broadcasting the same usage collection rules 204 to all STBs 202 and 205 associated with the headend 201. Alternatively, embodiments can involve selective broadcasting of the usage collection rules 204 to specific STBs 202. Each of the STBs 202 and 205 evaluates the received usage collection rules 204, and determines whether to opt-in for data collection or upload activity based on applicable rules in the usage collection rules 204. As illustrated, STBs 202 opt-in to data collection activity, and STBs 205 do not opt-in.

Evaluation of usage collection rules 204 can involve various factors associated with households, including STBs 202 and 205. Factors can include zip code (3-digit or 5-digit), percentage of an entire sample (e.g., a random selection of one percent of all households), type of STB or Internet device (e.g., model number, computer type), a node ID associated with the STB, and other variables (e.g., variables stored in a computer or STB registry including serial number, MAC, home ID, etc.). Evaluation of the usage collection rules 204 can also involve Boolean combinations of factors. For example, usage collection rules 204 can specify that selection=10% of households AND (zip code=117* OR 118*), where * is a wildcard representing any additional characters.

STBs 202 that opt-in to data collection activity can buffer the viewing data and randomly upload the viewing data to data collection listener 208. It is contemplated that STBs 202 that opt-in, and STBs 205 that do not opt-in, can buffer viewing data, and opting-in involves uploading the buffered viewing data. "Randomly" uploading can involve rules or intelligent algorithms that take into account aggregate network traffic, and predict the effect of uploading viewing data on the network. "Randomized" uploads can thereby distribute upload traffic among the STBs 202 to avoid network use spikes in the aggregate, and uploads may seem to occur randomly when considered from the perspective of an individual STB 202.

Figure 3:
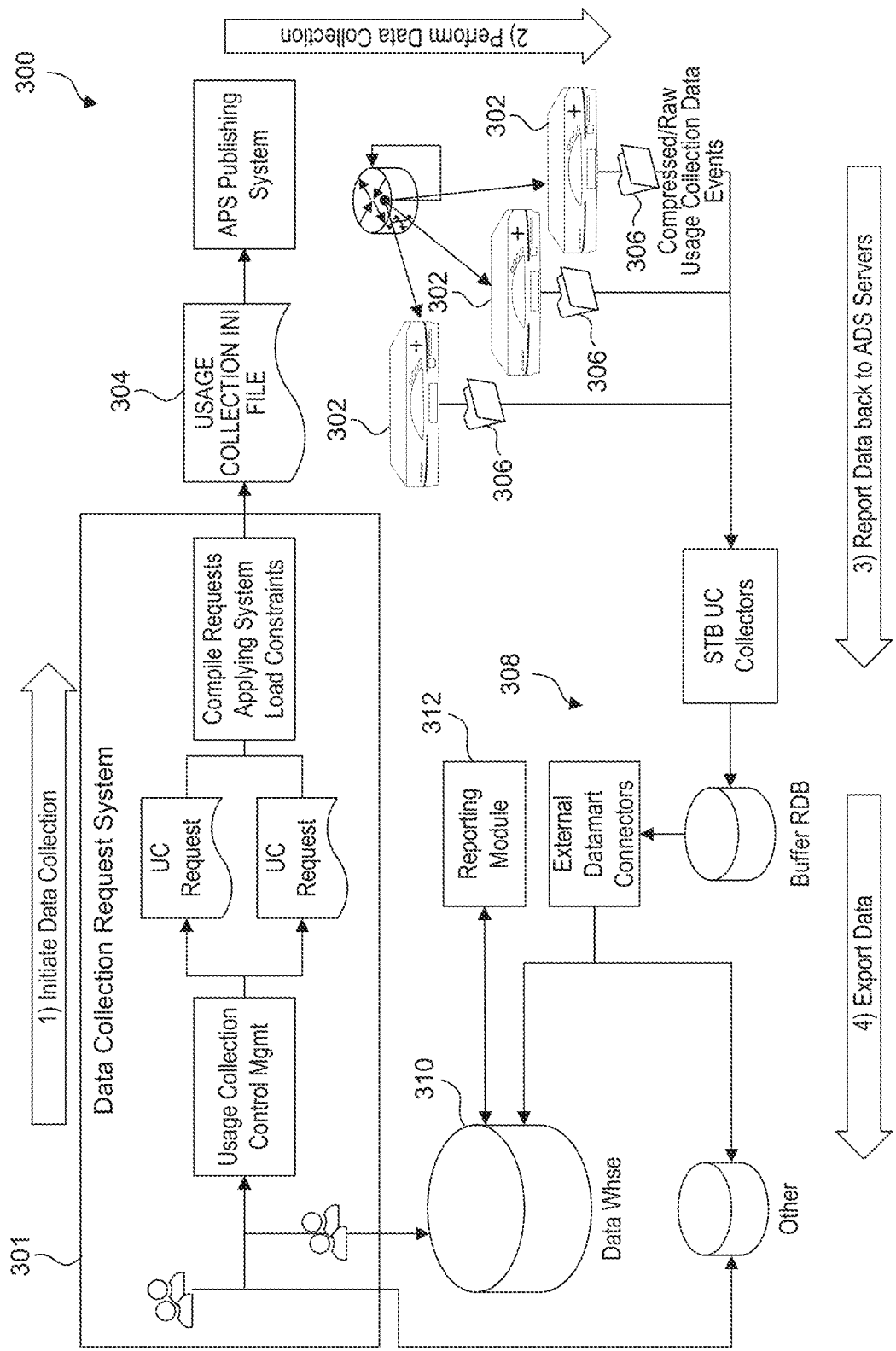
FIG. 3 is a block diagram of an architecture of a video system including collection of viewing data according to another embodiment.

FIG. 3 illustrates a block diagram of an architecture of a video system 300 including collection of viewing data 306 from within a service-provider managed network according to another embodiment. System 300 includes data collection request system 301 that distributes a usage collection file 304 to multiple STBs 302.

Based on the usage collection file 304, STBs 302 selectively collect and/or store usage collection data events and Internet usage events (viewing data 306). The viewing data 306 is collected by data collectors 308, and exported to data warehouse 310. Reporting module 312 can be in communication with data warehouse 310 to provide various reports based on viewing data 306 at data warehouse 310. Although one reporting module 312 is shown, multiple reporting modules can be provided in communication with various components and data of video system 300.

In accordance with the embodiments described above, an example system can collect second-by-second viewing records from many randomly selected and anonymous households. This includes anonymous tracking of viewing data including channel tuning events, capturing the date, time, channel and duration of the tuning event. This viewing data enables the statistical calculation of individual program share and viewership at frequent intervals (e.g., including an industry standard quarter-hour share) to determine commercial program value, as well as time-series tracking of anonymous sample households for the purpose of analyzing viewing behavior patterns.

Analysis and Use of Viewing Data

The anonymous viewing data from a selection of households can be combined with demographic and sociographic characteristics of the households on a de-identified basis. Anonymous information can include demographic composition, income, education, composition of household, lifestyle, behavioral, and product purchasing characteristics of households in a broadcast coverage area, without actually identifying specific individuals. Information can be organic, specifically anonymous viewer data relevant to providing cable, Internet and telecom services. Other information can be acquired via commercial sources, including standard household demographic data, purchased household segmentation data. Enhanced lifestyle data can enable ranking of networking/programming according to how likely audiences share the lifestyle characteristics of target consumers. The viewing data is thereby maintained anonymously, while providing the capability to understand and analyze the anonymous viewing data at a very detailed level, on a near real-time basis.

Data can be identified by metric name and category, identifications that can relate to aspects of information determined by analysis of viewing data (performed remotely and/or by the STB) and demographic and sociographic information/characteristics. The metrics, and other data/attributes, can be organized, analyzed, and presented in reports. The analysis can be done automatically, for example using a programmable machine learning algorithm to predict future behavior. Reports can be merged with various sort systems to manipulate the data for streamlined presentation of unique data and business intelligence, including micro-behavior analysis. Reports can be provided by reporting modules 112 and 312 as shown in FIGS. 1 and 3, respectively. Multiple reporting modules can be provided, using the metrics and other data/attributes available throughout the exemplary video systems.

Reports can be generated based on categories such as network, household count, STB count, hours viewed count, total household percentage, total STB percentage, and hours viewed percentage. The data provides additional options for creating reports, including selecting start/end dates, a collection task sample (e.g., a sample of one percent of total), video tier, region (e.g., specific metro areas, broadcast coverage areas, product/sales region hierarchies), network, parent network, demographic attribute, zip code, start/end channel durations, cumulative duration (e.g., apply a $5/15$ minute filter), and number of programs to include. Reports can be ranked based on various criteria/attributes to show details on the viewing data.

A first example report, audience by network (ranked by household count), can provide a list of networks in rank order of number of households viewing at any point during a user-selected time period. The first example report can be used to assess a specific network's reach during a period in time, and can be used to compare and contrast a set of networks. Ranking by household count can result in, for example, a news channel obtaining a high ranking. This ranking can be used to determine that households typically tune in to watch news. Additional details on viewer behavior regarding the news channel can be determined by using additional reports/ranking.

A second example report, audience by network (ranked by viewing duration), can provide a list of networks in rank order of number of hours viewed during a user-selected time period. The second example report can be used to assess a specific network's capture of viewing time during a period, and can be used to compare and contrast a set of networks. Ranking by viewing duration can result in, for example, the news channel obtaining a middle ranking. This ranking can be used to determine that households typically tune in to watch news for a brief duration, and then tune away. Various reports and rankings can be combined to develop very detailed micro-behaviors of audiences regarding viewed content.

A third example report, audience by network—combined SD-HD (ranked by household count), can be based on the first example report and also can automatically combine the high-definition (HD) and standard-definition (SD) version statistics for networks with HD versions. The third example report can be used, regardless of the split of viewership between HD and SD formats, to assess and compare/contrast networks as in the first example report. In the third example report, HD and SD viewership for each network can be represented by a single combined entry.

A fourth example report, audience by network—combined SD-HD (ranked by viewing duration), can be based on the second example report and also can automatically combine the HD and SD version statistics for networks with HD versions. The fourth example report can be used, regardless of the split of viewership between HD and SD formats, to assess and compare/contrast networks as in the second example report. In the fourth example report, HD and SD viewership for each network can be represented by a single combined entry.

A fifth example report, quarter hour share and rating, can be used to calculate ratings and/or a share of viewers for user-selected networks during each quarter-hour of a user-selected time period. The fifth example report can be used to assess a specific network's share/ratings over time, and to compare and contrast a set of networks. The fifth example report can be output as a graph depicting the household count, percent of household count (share), and rating for selected networks during each quarter hour period between selected start and end dates. The fifth example report can include combined SD/HD version statistics for networks with HD versions.

Additional example reports can be generated based on various criteria/categories of viewing data, including demographics. An additional report, audience by network with demographics, can describe viewers by network during a selected time period and according to selected demographic characteristics. This report can be used to assess a specific network's audience composition, comparing and contrasting a set of networks. Another report, program demographics, can describe the viewing audience for programs during a selected time period according to selected demographic characteristics. This report can be used to assess a specific program's audience composition, and can be used to compare and contrast a set of programs. Another report, quarter hour share with demographics, can be used as an enhancement to the fifth example report (quarter hour share and rating). This report can be used to calculate share of viewers for selected networks during each quarter-hour of a selected time period, adding the ability to select a specific demographic attribute to narrow the audience measured. It can be used to assess a specific network's share over time within a specific demographic, and to compare and contrast a set of networks. Reports can provide insights into viewing data by ranking each attribute and determining how it shows in an audience.

Viewing data can provide powerful diagnostics to television programmers. The significant sample size allows for understanding of small differences in actual viewing behavior within the viewing universes of numerous broadcast channels. Advertisers can target viewer characteristics using detailed selection to optimize ad inventory. Programmers can identify specific insights and applications, relative to their own audiences and their competitors' audiences.

Accordingly, it is possible to optimize proof of performance and business intelligence. Regarding proof of performance, embodiments enable collecting of specific and detailed data to show that advertisers are justified in their spending for ads that reach their intended targets. Regarding business intelligence, embodiments enable specific and detailed data associated with expected yields for a given day/time ad or promo slot. Accordingly, a broadcaster can more accurately price a given timeslot based on specific data. Furthermore, a broadcaster can advise prospective advertisers as to which timeslots to target, based on the demographics, content to be broadcast, and other factors. Accordingly, ads and promos can be matched with targeted timeslots at an extremely accurate and precise level, based on detailed viewing data and/or sample selection of demographics.

Figure 4:
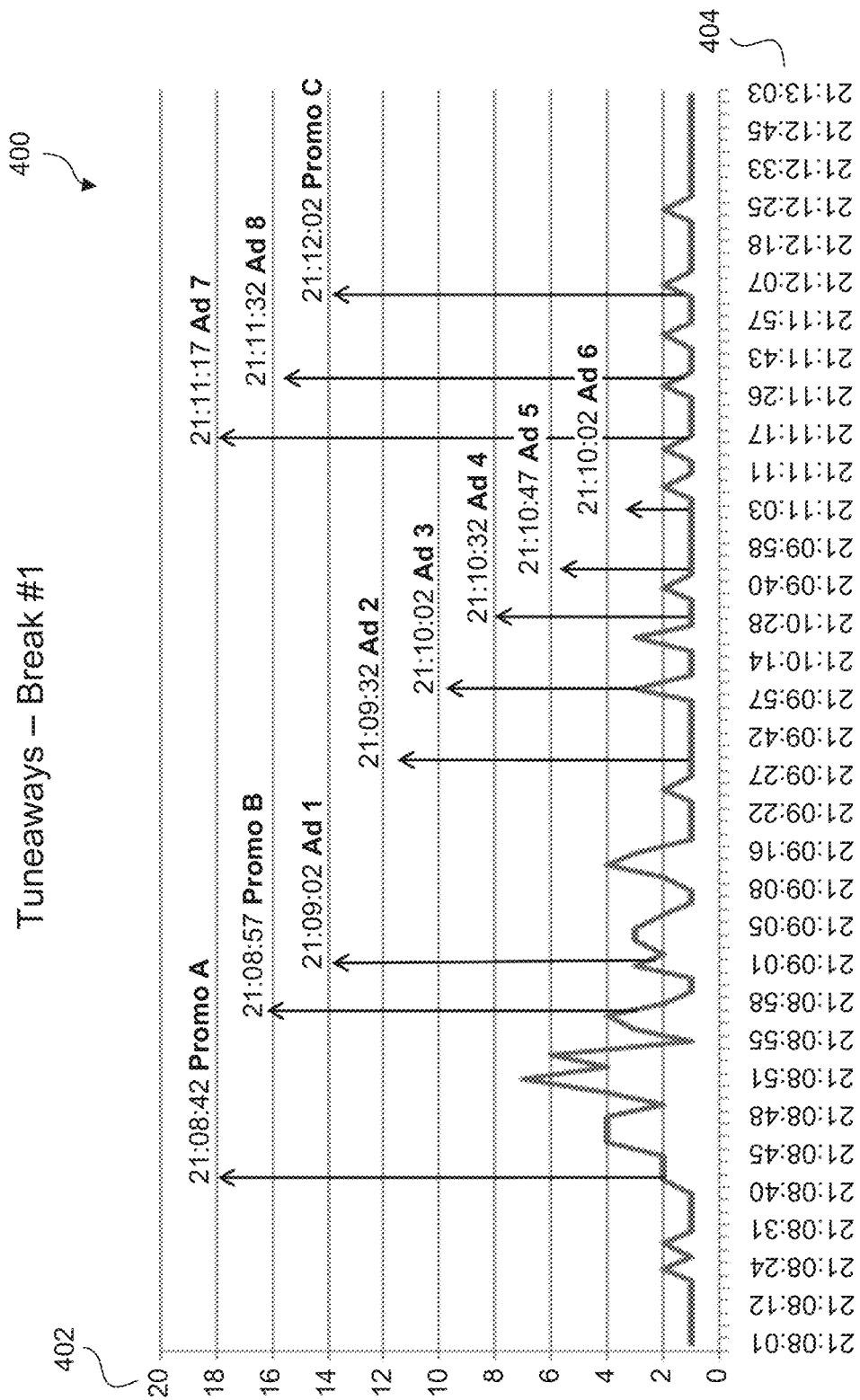
FIG. 4 is an example chart based on viewing data according to an embodiment.

FIG. 4 illustrates an example chart 400 based on viewing data according to an embodiment. Chart 400 illustrates the number of tuneaways 402 over time during a commercial break. The tuneaways 402 are associated with Promotional (Promo) spots A-C and Ads 1-8 occurring over time as identified by timestamps 404. Tuneaways 402 are incidents where a viewer issues a command to change the currently viewed channel. Embodiments of the system can include promo and ad descriptive information in the viewing data, along with timestamps. Embodiments can also obtain the promo and ad descriptive information from program content logs and as-run advertising logs, which identify the Promo spots A-C and Ads 1-8 with respect to timestamps 404 corresponding to timestamps of the viewing data.

Tuneaways 402 obtained from in-depth viewing data can therefore provide detailed viewer behavior throughout a broadcast, including during commercials. Tuneaways 402 at the second-by-second level allow mapping audience behavior to each second of programming and advertising content. Similar behavior can be obtained for Internet or telephonic activity associated with the household. For example, viewer data will indicate that a viewer watching a sports program tuned to a comedy program after ten minutes. This type of data can provide valuable insight if a large enough percentage of the sample audience did the same thing.

Analysis of viewing data enables the determination of detailed viewer behavior over time, including the ability to link events within a household. Household attributes include number of episodes viewed and number of minutes viewed. It is possible to create viewer profiles by using household attributes. Embodiments can therefore segment a program audience over an entire time span, e.g., broadcast season. Program audience segments can include, for example, "addicted" viewers watching eight or more premiere episodes live for a total of 300 or more minutes; "avid" viewers watching four to seven episodes for a total of 300 or more minutes; "frequent flyers" watching five to eleven partial episodes; "glued visitors" watching two to four mostly complete episodes; and "light samplers" watching up to sixty minutes over two to five episodes. Program audience segments enable identification of audience targeting opportunities. Therefore, it may be possible to reach, for example, two-thirds of active weekly premiere viewers by targeting "frequent fliers" and "glued visitors". Such information is valuable for proof of performance and business intelligence purposes, in negotiations between broadcasters and advertisers, program development, and promotion.

Viewing data can be used to enable Set Top Box Media Planning and Allocation, which can allow programmers to plan media by highest rated shows, networks, products and/or specific target audience characteristics. Such metrics can be used to identify viewership in low and non-rated networks. The metrics can also be used to maximize Gross Rating Point (GRP) selection, e.g., the size of an audience reached by a specific media vehicle or schedule, by finding and selecting across all networks, not just those that are highly rated.

Viewing data can also be used for Set Top Box Analytics, which can allow programmers and advertisers to find target audiences within the total viewership (for example, on over 500 individual networks) based on specific characteristics, identify competing networks, and find trends in network viewership.

Embodiments can enable the planning and placement of a broadcaster's internal marketing (cable cross channel) spots and external advertiser commercial spots. Planning and placement can be based on identification of characteristics of the target audience, using audience share calculations for each network of insertion by advertising zone or other ad insertion configuration, including specific dates and times.

Embodiments can also enable ranking of programs and networks based on share and viewership calculations. Ranking can allow maximum utilization of insertion inventory across the networks into which advertisements are inserted for a broadcaster or on behalf of external advertisers, by advertising zone or other ad insertion configuration.

Embodiments can report the actual movement of anonymous audiences in response to what they are watching, either programs or advertisements, including Internet activity. Multiple viewing events from a single household can be linked together in time series, and correlated with Internet or other activities.

The various analyses of the embodiments described herein provide diagnostic data to expand audience and behavioral insights. For example, embodiments can determine details regarding broadcasted programs, series, and channels. The details can include anonymously determining who is watching what at the program level, within and across series and channels. Embodiments enable determining statistical differences between audiences for individual programs; and the regularity with which individual viewing households view series installments.

Embodiments can determine details regarding audience composition and behavior. For example, embodiments can determine audience flow, including determining from where audiences tuned when arriving at a channel, and to where audiences tune when departing the channel. Such information enables coordinating the information from as-run ad logs with tuneaways at a second-by-second level, for example. Embodiments can include audience discovery, determining what would be a typical viewer of a given program or advertisement, and determining what other programs or advertisements the viewer typically watches. For example, weekly premiere viewers of a show can be identified and profiled for reaching potential viewers. Embodiments can determine audience behavior, including the loyalty of a given household/viewer to a specific channel as compared to its competitors. Determining audience behavior can also include determining percentage of total viewing time spent on a specific channel versus its competitors. Audience behavior can be used to assess audience loyalty via viewing frequency analysis, to create loyalty segments.

Embodiments can also enable audience hunting, including examining viewing habits of active viewer segments to identify promo placement opportunities to reach potential viewers. Therefore, it is possible to understand and maximize the current audience, and find and attract undiscovered audiences. Regarding the current anonymous audience, it is possible to determine what else the current anonymous audience is watching. It is also possible to determine where and how to entice the current anonymous audience to watch more often. Regarding undiscovered audiences, it is possible to determine other viewers having interests similar to the current anonymous audience, including what the other viewers are watching and where/how to entice them to discover and watch a given program or advertising.

Detailed audience intelligence, determined by analyzing viewing data, can be used not only for content development and creation, but also in assisting programmers to find the appropriate audience for already-developed content. By using the viewing data to determine detailed audience composition, behavior, preferences, etc., content developers can customize the content and programming that they invest in developing. For example, a content developer can determine that an audience is receptive to a particular product placement, actor, or other content/feature based on viewing data. The content developer can incorporate that product placement and/or actor in the content being developed, and the audience is likely to be more receptive to that content. The richness of viewing data provides analysis on a detailed, micro-behavioral level for an audience. Detailed intelligence on audiences can enable the content developer to increase the likelihood that many detailed aspects of programming content will be successfully received, and decrease the likelihood of developing a show, content, programming, etc. that "flops" when broadcast to an audience.

Embodiments can also determine promo effectiveness to improve return on investment and anonymous micro-behavior insights. For example, embodiments can determine sub-program level analyses, minute by minute or second by second. Accordingly, it is possible for embodiments to determine how well a given program or advertisement holds an anonymous audience, or stimulates tune-ins to that program or advertisement. It is also possible to determine the effect of devices such as interactive overlays, based on the corresponding Internet activity that correlates with the timing of the interactive overlay. By determining which promo spots were associated with a higher tune-in rate, promo effectiveness and return on investment can be improved.

Embodiments can facilitate the use of data collected and/or analyzed in near real-time, for specifically targeting advertising and promotions to the particular audience while using the STB. For example, viewing data from a STB and Internet usage can be collected, and based on the data, ads and promos can be served to the STB in near real-time. Accordingly, embodiments can maximize the effectiveness of promos and ads, without a need to predict in advance the target audience likely to be using the STB.

Figure 5:
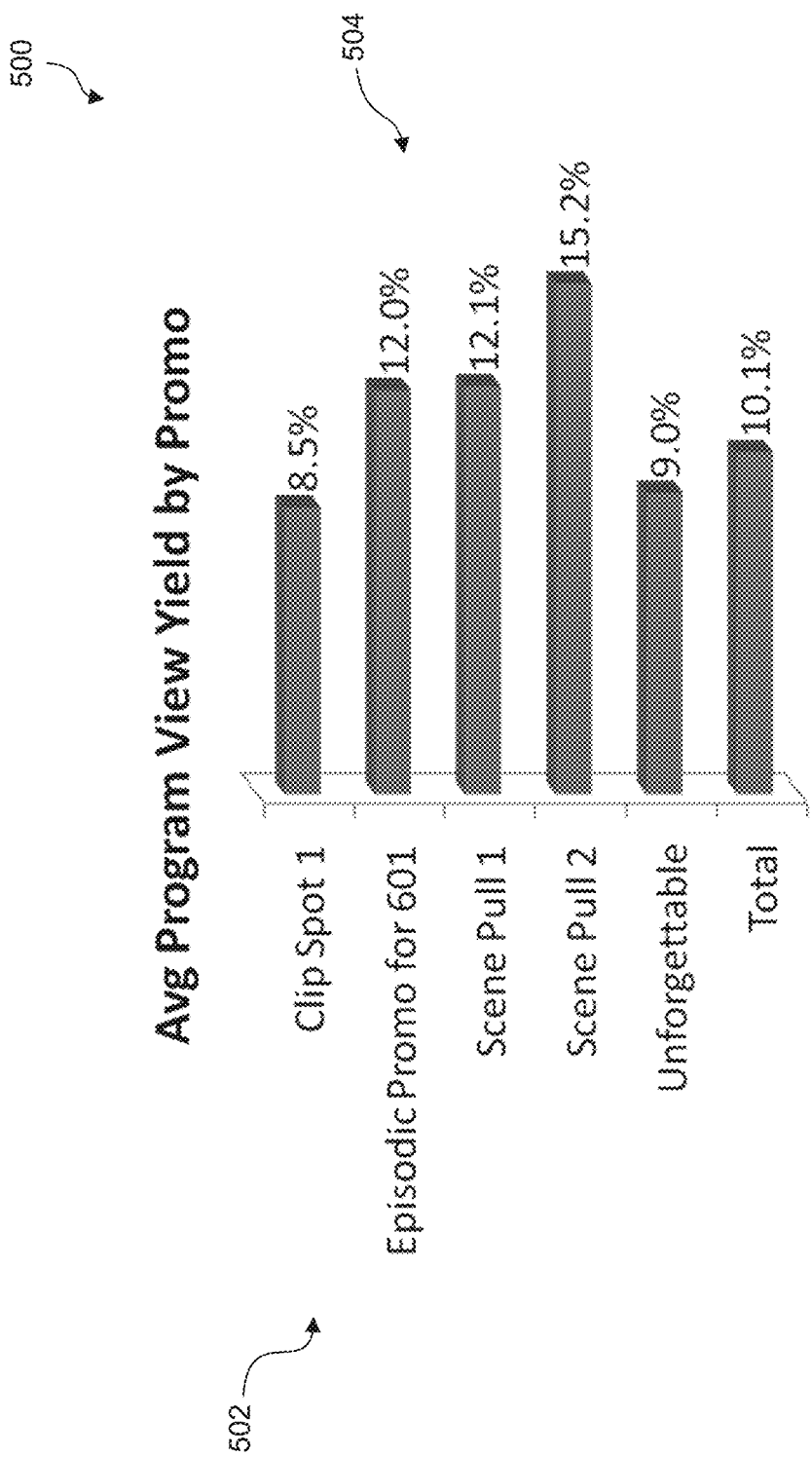
FIG. 5 is an example chart based on viewing data according to an embodiment.

FIG. 5 is an example chart 500 based on viewing data according to an embodiment. Viewing data can be analyzed for viewership of specific promo spots 502, with respect to other viewing patterns of those users viewing promo spots 502. For example, viewership of a specific promo spot 502 can be compared with viewership of the promoted program, and other of the specific promo spots 502, to determine which of the anonymous viewers of the promo spots 502 eventually watched the promoted item. For example, analyzing viewing data can enable identification of viewers of promo spots over various days of the week leading up to the airing of the promoted program. When the program is broadcast, viewing data can enable identification of viewers of the program who previously viewed the promo spots.

Embodiments enable determination of a view yield or promo yield 504. Yield 504 can be considered in determining whether a spot has a higher tune-in rate, and therefore is presumed more effective. Accordingly, it is possible to enable analysis of yield and return on investment of the promo spots, valuable in establishing proof of performance. For example, embodiments can determine that promo yield can be significantly improved by placement of promo spots on the same day of the week as the promoted program. Additionally, embodiments can determine that same-day promo yield and 7-day advance promo yield can significantly exceed overall average yield. Analysis of viewing data therefore enables calculation of an effective yield of program viewers from specific promo airings. Furthermore, it is possible to optimize promo scheduling, based on day of the week and/or time of the day, valuable for business intelligence.

Embodiments can identify, capture, and account for variables that affect the performance of promos. Analysis thereby provides a valuable view of individual promo performance. For example, promos can be aired at various times of the day and days of the week. By indexing and/or weighting each airing of an individual promo, it is possible to determine how each promo benefits from a given day or time placement mix. Such information is valuable for adjusting prices charged for promo or ad placement, customized for the particular promo or ad and day or time placement. Proof of performance and business intelligence can thereby be optimized.

Accordingly, embodiments enable determination of return on investment including expected yield for a given content of the promo or ad, and for a given insertion day/time mix. Therefore, promotional dollars and cross-channel value can be maximized.

Embodiments can use programmable machine learning algorithms for real-time prediction of future viewer behavior patterns. Example algorithms can be implemented as a Bayesian network or a Hidden Markov Model, for example. Algorithms can acquire channel tuning and viewing activities, and automatically compute an optimal viewing pattern graph out of the universe of all viewing activities, as a function of time. The algorithms can output a predicted or maximum likelihood estimator of channel/service/time state vector. Cluster analysis can be performed to generate a list of predicted channel/services by groups, clustering users into groups that are likely to watch or tune to a specified destination at a specified time. Embodiments can be adapted for applications where future behavior, e.g., in a probabilistic sense, can be leveraged to improve service, value, or revenues. Results of machine analysis can be utilized for optimal ad placement, maximizing customer impression yields, increasing value to advertisers by providing a greater known probability of reaching a larger audience, and offering such business intelligence at a premium charge.

The algorithms can be implemented on a system, and can be implemented as a distributed stochastic learning agent model that operates on embedded devices such as STBs and other devices. Client agent processes can be distributed and executed concurrently on multiple embedded devices participating as a system. An initialization phase can be used to distribute (scatter) operating parameters to embedded devices for the machine learning algorithm. Output from the distributed agents can be sent to a remote system, e.g., a server system in the Cloud, for processing that can include cluster analysis.

Optimizing Inventory Based on Predicted Viewership

In an example embodiment, operations performed by system 300 in the collection of viewing data 306 from within a service-provider managed network include evaluating past viewership data for a periodic event, determining a tendency of a market segment to view the periodic event, predicting viewership for a future event based on the determined tendency, and optimizing advertising inventory based on the predicted viewership.

Figure 7:
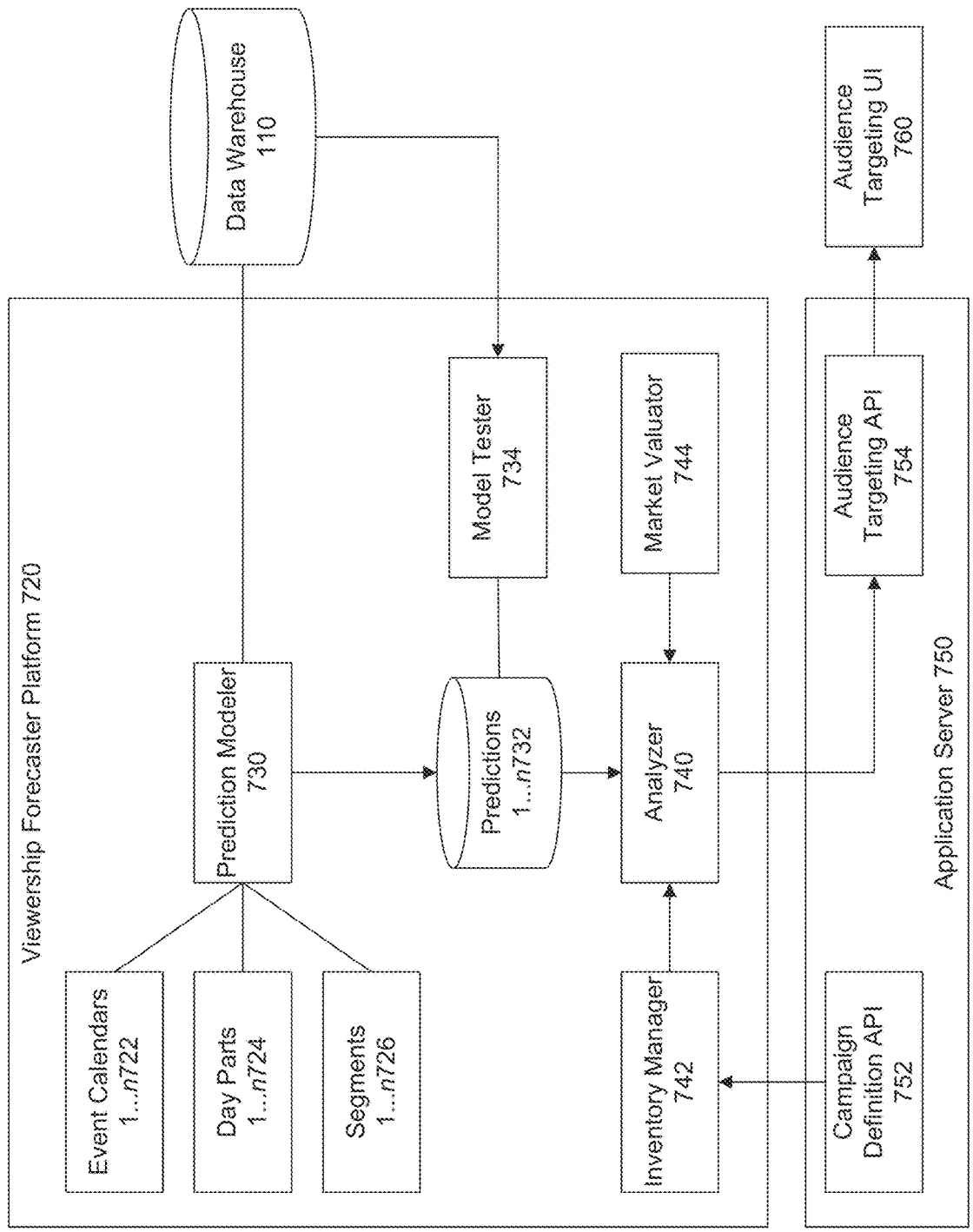
FIG. 7 is an example architecture of a viewership prediction platform, according to an embodiment.

FIG. 7 shows an example viewership forecaster platform 720 located on system 300. Viewership forecaster platform 720 is connected to data warehouse 100 and includes a prediction modeler 730, operable to process one or more analytical structures such as, for example, event calendars 1 . . . n 722, day parts 1 . . . n 724, and/or segments 1 . . . n 726.

In an example embodiment, prediction modeler 730 outputs predictions 1 . . . n 732 based on evaluation of past viewership data accessible to viewership forecaster platform 720 on system 300 and/or stored in data warehouse 110. A model tester 734 is operable to evaluate the accuracy of predictions 1 . . . n 732, determine confidence intervals, as well as evaluate the overall performance of prediction modeler 730 against historical information and/or baseline indicators based on information accessible on system 300 and/or stored in data warehouse 100. Predictions 732 are analyzed by an analyzer 740 as described herein.

Figure 8:
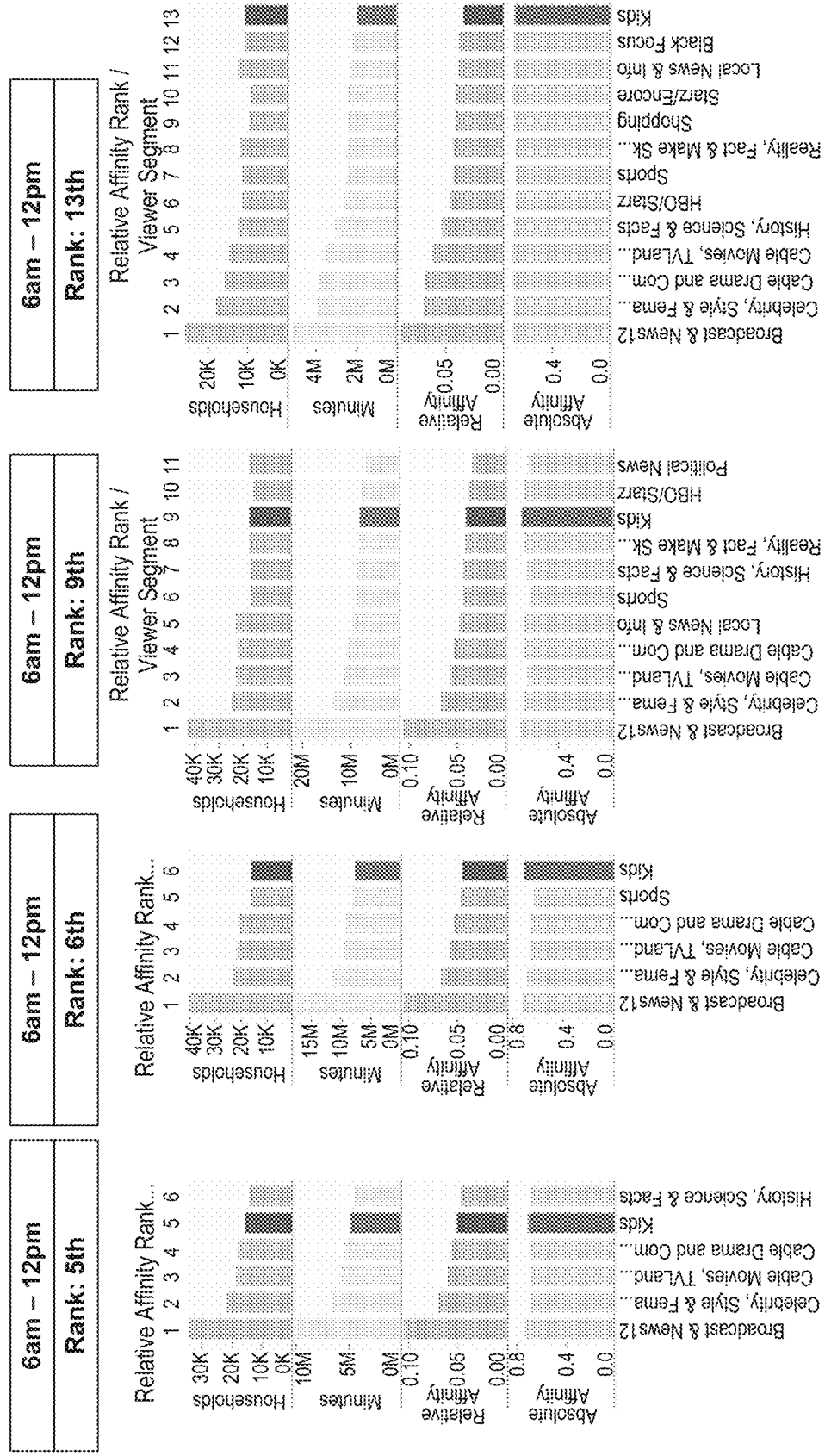
FIG. 8 is an example chart based on prediction of viewership, according to an embodiment.

FIG. 8 shows an example analysis output of analyzer 740 in the form of a chart. The example chart in FIG. 8 shows predicted viewership segmented by age and day part. The example chart also displays viewership segmented by an age demographic (e.g., kids) and highlights peak hours on particular days during which this viewer segment is likely to watch. The example chart further indicates the amount of television the segment, captured by segments 1 . . . n 726, is likely to watch on the bases of event calendars 1 . . . n 722 and/or day parts 1 . . . n 724, which are modeled by prediction modeler 730 as described herein. In an example embodiment, the chart of FIG. 8 plots predicted viewership segment peaking variation by day part, using the example of kids. In this non-limiting example, the "kids" viewership segment is predicted to peak during the middle of the day, i.e., when most young children are active and awake to watch television. Viewer segments may be sorted by the amount of TV watched at each time slot, thereby ranking each time slot as shown.

In an example embodiment, analyzer 740 is configured to synthesize raw output from prediction modeler 730 by calculating parameters supplied by an inventory manager 742 and/or a market valuator 744 to contextualize predictions 732 in terms of advertising inventory, as described herein. To allow user access to, and interaction with, viewership forecaster platform 720, an application server 750 hosts one or more applications directed to displaying and rendering analysis output by analyzer 740. Inventory manager 742 is configured to receive input from one or more sources using a campaign definition API 752 hosted on an application server 750. Audience targeting API 754 facilitates access to such analytical output. In an example embodiment, an audience targeting UI 760 enables user access to, and interaction with, analytical output of analyzer 740.

Figure 9:
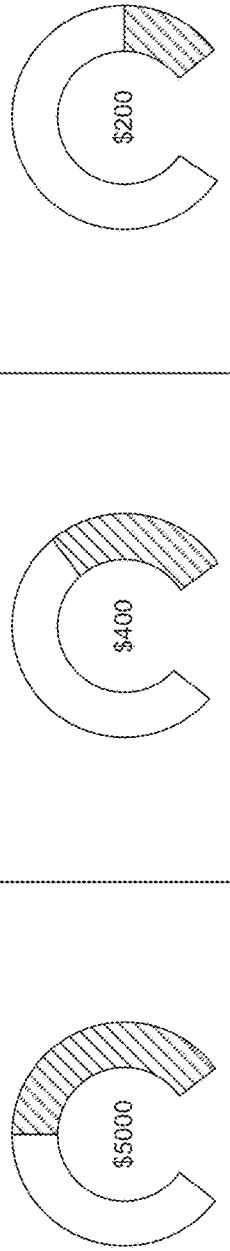
FIG. 9 is a screen-shot of a user interface for displaying and interacting with information, according to an embodiment.
Figure 10:
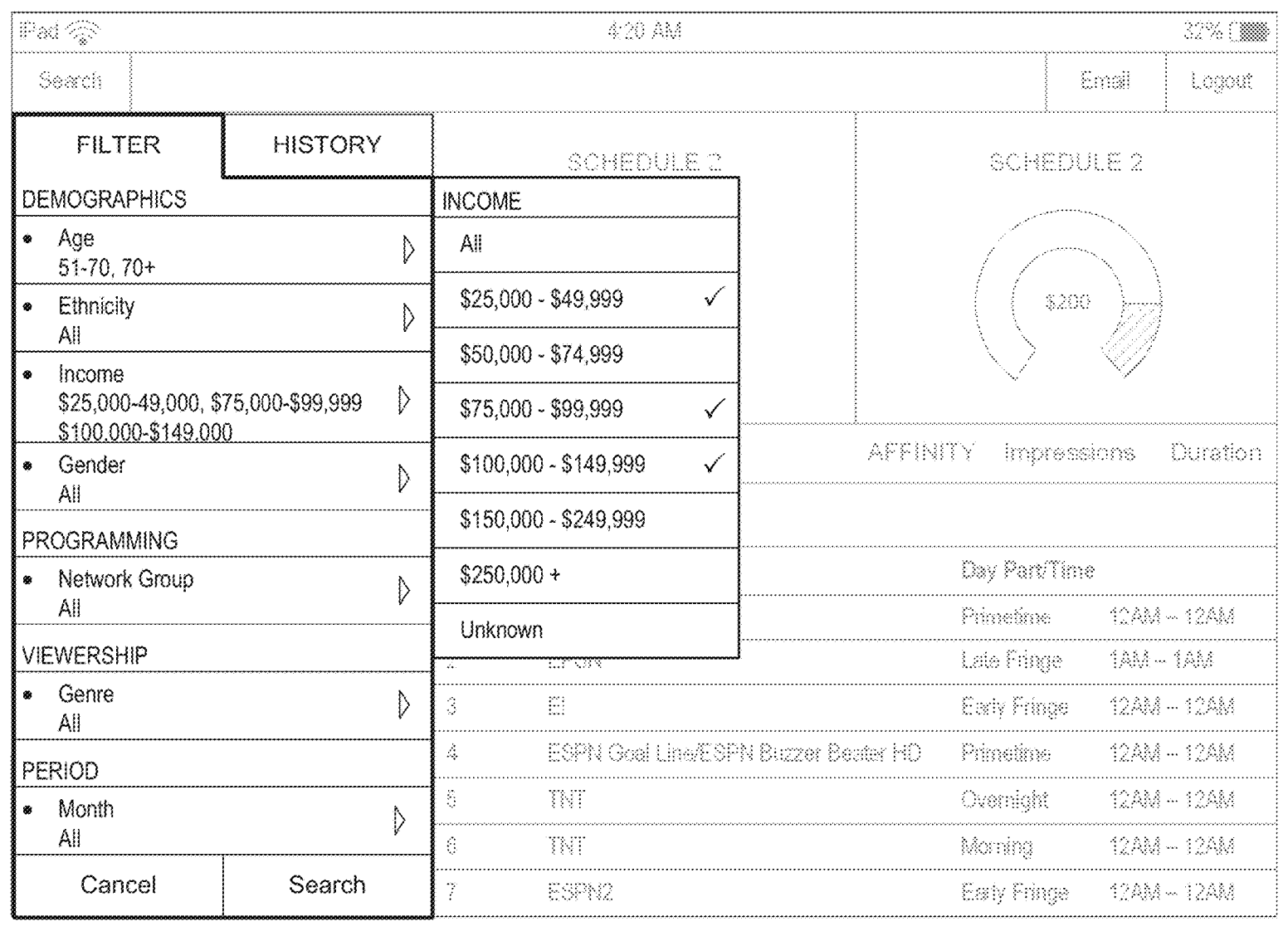

FIGS. 9 and 10 show example displays rendered on audience targeting UI 760. By way of example, not of limitation, audience targeting UI 760 operates on a consumer electronic device, mobile or otherwise, such as a smart phone, tablet, PC, etc. as described herein. Audience targeting UI 760 may be useful for sharing information and allowing for dynamic interaction with predictions 732 and other assets of viewership forecaster platform 720.

As shown in FIGS. 9 and 10 audience targeting UI 760 is operable to provide an experience to a user. A user of audience targeting UI 760 may perform a search and view results providing detailed information regarding predicted viewership. For example, one or more schedules may be displayed to a user operating audience targeting UI 760 on a smart phone or tablet. In an example embodiment, schedule representations correspond to units of advertising inventory available for purchase on one or more networks, for one or more day parts, and/or on one or more tiers. Tiers may be based on ranking of time slots as a function of predicted viewership and may be integrated into audience targeting UI 760 through interaction with inventory manager 742 via campaign definition API 752.

In an example embodiment, results rendered on audience targeting UI 760 may display the potential total target audience in connection with one or more unit prices, as shown in FIG. 9. A metric for displaying affinity, as described herein, may be toggled between impressions and duration of potential viewership. Audience targeting UI 760 may display the rank and time slots associated with particular network groups for a given schedule. Audience targeting UI 760 enables filtering of results based on, for example, one or more viewership segments, as shown in FIG. 10 which shows a filter panel. When search criteria is selected search results are filtered to display viewership predictions for based on viewer segments. Specific filtering criteria may be listed inline underneath one or more items displayed to a user. Audience targeting UI 760 may provide a function for generating an electronic message with a pre-populated subject field and a message body containing results of a search. Audience targeting UI 760 may store a search history.

In a non-limiting example, operations performed allow for accurate prediction of viewership in the future broken down by market segment. Such predications are useful for improving the marketing of advertising inventory, supporting programmer negotiations, aiding in product development, evaluating bandwidth allocation, generating service tiers, planning advertising campaigns, and targeting audiences based on their predicted level of viewership. For example, by evaluating past viewership data for a periodic event, such as, for example, the U.S. Open, and determining a tendency of a market segment to view the periodic event, it is possible, as described herein, to predict viewership for a future event based on the determined tendency. For example, by evaluating past viewership data for an event such as, for example, the U.S. Open, it may be determined that 10% of subscribers watch tennis on TV, the viewership being clustered around big events like the U.S. Open, rather than small events not likely to feature marquee players. Based on this, tendencies may be determined such as, for example, that a statistically significant percentage of this market segment has a tendency to watch other types of sports programming, such as, for example, golf, thereby allowing for market segmentation based on behavior. Operations for determining a tendency of a market segment to view a periodic event may even detect correlations which are not readily apparent or intuitive, such as, for example, that viewers of tennis are not likely to watch baseball or more likely to watch cooking. Determining a tendency based on viewing behavior may reveal to advertisers which viewers they should be communicating with and when. With respect to advertising inventory, time slots which may not conventionally be considered prime time or top tier may have enhanced value to a particular advertiser based on the predicted viewership of a particular market segment.

In an example embodiment, advertising inventory may be optimized based on the predicted viewership by identifying for a given time slot one or more market segments for which predicted viewership exceeds an advertising value threshold. By way of example, not of limitation, if the value to an advertiser of communicating with a particular market segment (e.g., the 10% of subscribers who view tennis) exceeds the conventional cost of that time slot, then the time slot may be associated with a premium based on the predicted viewership. The time slot may be offered directly to one or more advertisers positioned to target that market segment. In an example embodiment, a user interface in the form of a mobile and/or web application may be configured to display these predictive analytics in a dynamic fashion, making them accessible as well as interactive.

Evaluating Past Viewership Data

In an example embodiment, past viewership data for a periodic event is evaluated, for example, by analyzing viewership behavior associated with one or more set top boxes within a service-provider managed network. The evaluating may include associating the analyzed viewership behavior with one or more market segments based on subscriber data available to the service-provider. Evaluation may be enabled by one or more components of system 300, data warehouse 110, and viewership forecaster platform 720.

In an example embodiment, a periodic event includes a national holiday such as, for example, July 4th, Christmas, New Year's, Thanksgiving, Fathers Day, Mothers Day, Valentine's Day, Easter, and/or Passover, which may impact viewership. A periodic event may be indicated in a programming event calendar such as, for example, the SuperBowl, Grammy's, Oscar's, U.S. Open, World Cup Soccer, Billboard, PGA Events, etc. In an example embodiment, a periodic event may be indicated on a weather calendar, such as for example, snowstorms, hurricanes, rainy/sunny days, cold/hot days. One having skill in the relevant art(s) will understand that the above listed events are provided by way of example, not limitation. A periodic event may be characterized by repetition, however, such repetition is not limited to a particular interval and may include weekly, daily, and/or hourly cycles. Intervals need not be regular and may occur sporadically over a given span of time. A periodic event may evolve over time while still producing a consistent impact on viewership. A periodic event may be scheduled in advance (e.g., Thanksgiving's Day parade) and/or may occur without notice (e.g., breaking news). A periodic event may be captured in an analytical structure, such as, for example, event calendars 1 . . . n 722. Event calendars 1 . . . n 722 are modeled by prediction modeler 730.

In an example embodiment, periodic events may be identified, for example, based on an evaluation of viewership data which is available to a service-provider. For example, viewership patterns may reveal events, periodic or otherwise, which may produce spikes or surges in viewership. Such patterns may reveal a tendency among viewers useful for predicting the future viewing behavior of one or more market segments. Patterns may be modeled as one or more analytical structures, such as, for example, day parts 1 . . . n 724 and/or segments 1 . . . n 726 as inputs to prediction modeler 730.

In an example embodiment, programmable machine learning algorithms are used to analyze past viewership data acquired from channel tuning and viewing activities input to prediction modeler 730. Such data may be warehoused, for example, in data warehouse 110. One or more algorithms may automatically compute a historical viewing pattern graph out of all viewing activities as a function of time. Algorithms may be implemented as probabilistic classifiers. A viewing pattern graph of historical data may classify one or more events as periodic based on the statistical significance of recognized patterns.

In an example embodiment, past viewership data is evaluated by market segment, such as segments 1 . . . n 726. For example, prediction modeler 730 may perform a cluster analysis to generate a viewing pattern graph of periodic events segmented according to various characteristics associated with viewers. Characteristics may be determined from subscriber data available to the service-provider, also maintained to preserve anonymity of individual viewers. For example, anonymously collected and maintained viewing data may be combined with sales, demographic, and/or sociographic characteristics of the households, while still maintaining anonymity of the viewing households. Collected viewing data may provide a very detailed understanding of viewing patterns, including television programming, commercials, and/or Internet usage, while maintaining viewer anonymity. Such data may be available for evaluation on a near real-time basis, allowing past viewership data to include very recent events in the past.

In an example embodiment, demographic, geographic, and/or behavioral data may be collected and associated with anonymously maintained viewing data. Such information may include the number of viewers per set top box, household demographic composition, income, education, household composition, lifestyle characteristics, behavioral patterns, product purchasing characteristics, etc. Such data is collected without identifying specific individuals. Data may be acquired from a third-party, such as, for example, a standard household demographic clearinghouse, a seller of segmentation data, and/or a marketing database. Set top box collected information may include the brand, type, and/or model of television, phone, computer, PDA, mobile device, etc. Such viewer characteristics may be associated with anonymous viewing data and/or stored in data warehouse 110.

In an example embodiment, viewership behavior associated with one or more set top boxes within a service-provider managed network may include data reflecting number of viewers in a household and/or at a given time, proportion of viewers watching, what is being watched given what is available to watch on a given set top box based on subscriber data available to the service-provider, continuous minutes watched of a given program, interruption, time of watching, data acquired from channel tuning, frequency of watching, genres of programming (e.g., news, sports, cooking), individual programs watched, other viewing activities, and/or patterns of Internet usage. One having skill in the relevant art(s) would understand that the above listed types of viewership behavior are listed by way of example, not limitation. Measures of viewership behavior may be configured, modified, adjusted, and/or edited based on one or more target behaviors of interest.

Determining Market Segment Tendencies

In an example embodiment, a tendency of a market segment to view one or more periodic events is determined. For example, determining may include measuring actual minutes watched of a periodic event relative to potential minutes watched on one or more set top boxes within a service-provider managed network. For example, determining may include quantifying viewer affinity for the periodic event relative to available alternative programming based on subscriber data available to the service-provider.

In an example embodiment, a market segment identifies a subset of the viewership grouped by one or more characteristics, captured for example by segments 1 . . . n 726. In a non-limiting example, a market segment includes a subset of viewers within a specified age range, income range, and/or geographic range. Viewership data accessible from data warehouse 110 may be segmented based on one or more viewer characteristics of interest. For example, viewership may be segmented based on viewing behaviors such as, for example by genre (e.g., news, sports, cooking) and/or viewing patterns (e.g., morning, night, short durations). One having skill in the relevant art(s) would understand that listed viewer characteristics or attributes for defining market segments as are listed by way of example, not limitation. Market segments may be pre-set, for example, to reflect industry criteria specifically relevant to advertisers and/or for determining advertising value such as, for example, age, income, age, genders, and/or other criteria.

In an example embodiment, patterns of viewership behavior are derived from the evaluation of past viewership data with respect to one or more periodic events. Patterns of viewership are also associated with one or more demographic, geographic, sociographic, and/or other viewer characteristics. One or more viewer characteristics may be selected to define a market segment. Market segments may be created, deleted, configured, modified, adjusted, and/or edited based on one or more target characteristics of interest.

In an example embodiment, a tendency to view a periodic event is determined for a market segment. Tendency may include one or more measures of affinity. Affinity may be measured in relative and/or absolute terms. For example, a measure of relative affinity may reflect minutes watched of a program and/or a type of program divided by the total minutes watched of all programs and/or types of programs. Absolute affinity may reflect minutes watched of a program and/or a type of program divided by total potential minutes available to be watched of the program and/or program type. In an example embodiment, a measure of relative affinity includes a determination of the likelihood to choose among available alternative programming. A measure of absolute affinity includes how much is watched after choosing among available alternatives.

In an example embodiment, affinity is indexed for one or more market segments, useful for targeting, producing analytics, supporting programmer negotiations, developing products, evaluating bandwidth allocation, setting service tiers, and planning campaigns.

In an example embodiment, viewership may also be measured in terms of viewer impressions. For example, a measure of average quarter hour impressions may be counted based on criteria such as, for example, a household watching at least five minutes for a given program and/or type of program to count as an impression. One having skill in the relevant art(s) will understand that other measures of viewership are possible.

In an example embodiment, tendency includes determined correlations of viewer behavior. For example, such a determination includes a statistically significant correlation between minutes watched of a periodic event and one or more market segments. In an example embodiment, correlations may be identified as defining one or more tendencies within one or more market segments. For example, an evaluation of an event across total viewership may not be classified as producing a surge in viewership overall, however, the same event may be classified as surging within a particular market segment.

In an example embodiment, determination of correlations between viewership and market segments may be implemented by one or more algorithms such as, for example, a clustering algorithm, a bi-correlation clustering algorithm, etc. A determined correlation may also be evaluated for its strength, statistical significance, relevance, and/or potential confounders. In an example embodiment, a correlation is classified as informative based on a determination of its Pearson product-moment correlation coefficient. An informative or significant correlation may define a tendency with respect to a market segment.

In an example embodiment, a tendency of a market segment to view one or more periodic events may be determined automatically. For example, updates, new data, and/or routine refreshes may be propagated through system 300. Updated, new, and/or refreshed data is automatically and/or dynamically evaluated to identify periodic events and/or to determine a tendency of a market segment to view one or more periodic events. Such data may be dynamically output to reporting module 312 and/or as data structures operable for communicating data to one or more application programming and/or user interfaces.

In an example embodiment, determining a tendency of a market segment to view one or more periodic events is performed by prediction modeler 730.

Generating Predicted Viewership Calendars

In an example embodiment, viewership is predicted for a future event based on the determined tendency. For example, the determined tendency of a market segment to view a program and/or type of program is useful for predicting future viewership. Predicting includes determining a probability that a future event will receive comparable viewership based on the determined tendency of a market segment to view the periodic event in the past. Such a determined probability may be associated with one or more market segments, thereby predicting viewership for future events. In an example embodiment, prediction modeler 730 outputs predictions 1 . . . n 732 based on determined tendencies.

In an example embodiment, programmable machine learning algorithms are used to predict future viewer behavior. One or more algorithms may automatically compute an optimal viewing pattern graph out of the universe of all viewing activities, for example, as a function of time. Algorithms may output a predicted or maximum likelihood estimator of channel/service/time state vector. By way of example, not limitation, algorithms may be implemented as a Bayesian network, Hidden Markov Model, etc. Cluster analysis may be performed to generate one or more lists of predicted programming, channels, services, and/or market segments predicted to watch or tune to a specified destination at a specified time. In an example embodiment, time granularity includes any specific division of time, including but not limited to standard division of time (e.g., an hour, half-hour, day, week), and/or arbitrary division of time (e.g., time slot). Time corresponds to a calendar mapping which may display day parts operable to facilitate scheduling and future planning. In an example embodiment, scheduling is fully integrated with prediction such that predictions of future viewership may automatically populate future day parts and/or time slots. For example, periodic events may appear in an event calendar with associated predictions for viewership, including metadata such as the determined tendency of a market segment to view the event based evaluation of the past viewership data and viewership behavior.

In an example embodiment, predictions are generated at the level of an individual program, program type/genre, channel, network, and/or any other tier or segmentation of interest. Estimation of target variables including market segment may predict number of households, predicted minutes of watching, and predicted affinity. Predictions by market segment (e.g., kids) may be plotted by season, month, week, day, day part, and/or other division of time. Predictions may be used to isolate surges (e.g., prime time) or may better predict prime times than conventional wisdom or non-predictive modeling. In an example embodiment, predictions 1 . . . n 732 are may be further processed for analysis by analyzer 740. Analyzer 740 may be configured output reports and analysis such as, for example, the chart shown in FIG. 7. Other reporting formats are possible.

In an example embodiment, a prediction modeling engine automatically generates a corresponding confidence indicator or metric for each prediction. Such an indicator may be based on accuracy (e.g., rate and degree of correctness), precision (e.g., repeatability), success and failure (e.g., raw or based on thresholds for accuracy), and/or other measures of reliability. In an example embodiment, such model testing includes comparing model predictions against actuals (e.g., in real-time). Model testing may include use of one or more training sets for comparing predictions against known and/or historical samples. In an example embodiment, model testing is performed by model tester 734.

Optimizing Inventory Using Predictions

In an example embodiment, advertising inventory is optimized based on predicted viewership. Predicted viewership and associated market segmentation metadata is useful for optimizing advertising placement, maximizing customer impression yields, increasing value to advertisers by offering a greater known probability of reaching a larger audience, and/or by offering business intelligence at a premium charge. Predicted viewership may be imposed on and/or incorporated into pricing and/or added value schemes applied to an advertising inventory, for example, by differentiating time slots conventionally relegated to lower-level tiers of perceived advertising value. Predictions may change perception and justify different pricing, allocation, and/or value associated with advertising inventory. In associating a market segment with a particular inventory item, a time slot of conventional lesser value may be elevated for an advertiser positioned to target that market segment.

In an example embodiment, optimization includes identifying for a given time slot one or more market segments for which predicted viewership exceeds an advertising value threshold. Such an advertising value threshold may be defined in terms of predicted viewership taking into account a confidence metric. An advertising value may be based on objective market value for a given time slot, a tier, network, number of viewers based on available data, and/or other custom value measures. For example, a custom measure includes maximizing customer impression yields in one or more target market segments. Predicted viewership for one or more target market segments may differ from viewership across the base of total viewership reflected in base inventory tiers. Optimization includes associating a premium with the time slot based on the predicted viewership of the one or more market segments identified. Optimization includes offering the time slot directly to one or more advertisers positioned to target the one or more market segments identified. In an example embodiment, market valuator 744 manages information for evaluating an advertising value and outputs associated data structures.

In an example embodiment, one or more information assets located on system 300 provide an application programming interfaces (API) useful for facilitating access to data and metadata associated with predictions. For example, system 300 includes architecture for receiving requests from one or more clients connected to system 300 over a network and for posting responses to one or more clients using API protocols for exchanging data and/or commands between a client and system 300. A request may include a query and/or an instruction to populate one or more remote or local data structures with real-time data.

In an example embodiment, client applications may establish an account with one or more information assets housing prediction information and related metadata stored on system 300. Account information may include a set of login credentials (e.g., a username, password). Client applications include but are not limited to native software, a browser, web applications operating in a browser, and/or mobile applications such as, for example, as may operate on a smart phone, tablet, and/or other portable device.

In an example embodiment, campaign definition API 752 facilitates interaction with inventory manager 742 useful for inputting information with respect to campaigns and initiatives in a manner that incorporates data and analysis output by analyzer 740.

In an example embodiment, a user interface (UI) is rendered on one or more client applications operable to facilitate interaction with one or more information assets located on system 300. For example, the UI may provide audience targeting analytics to a user of a computing device connected to system 300. For example, a UI may include input and controller elements configured to receive inputs and selections from a user. Inputs may be communicated to system 300 as requests, SQL queries, and/or other commands operable to cause system 300 to return requested data and/or unrequested supporting data. Inputs may include one or more selections by a user such as, for example, search terms, selection of display elements (e.g., buttons, dials, menus), manipulation of display elements (e.g., sliding bars, drag and drop), and/or the rendering of one or more graphical representations of, for example, predictions. A display may be refreshed at intervals or in real-time. In an example embodiment, a selection is received from a user to display predicted viewership for a market segment and a representation of predicted viewership for the selected market segment is displayed to the user. In an example embodiment, representation of predicted viewership is graphical (e.g., a pie chart) and may be manipulated by the user to slice and dice the underlying data according to different market segments, viewership attributes, or pricing categories. Such a user interface is useful to employees of a service-provider sales force in marketing advertising inventory to prospective customers. One having skill in the relevant art(s) will appreciate that reporting module 312 may perform these functions. In an example embodiment, audience targeting API 754 facilitates access to and interaction with assets of viewership forecaster platform 720 using audience targeting UI 760, screen shots of which are shown in FIGS. 9 and 10.

Figure 6:
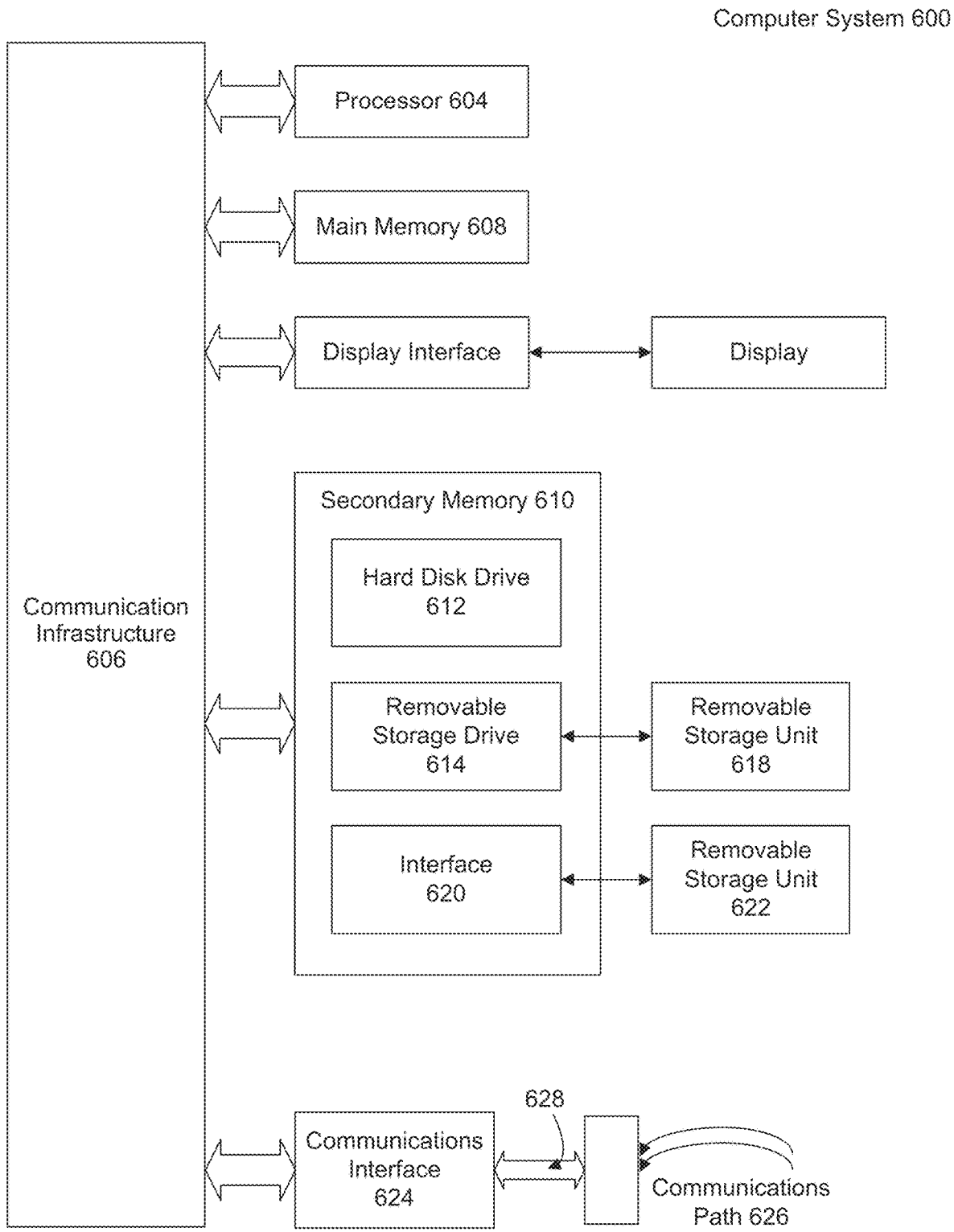
FIG. 6 is a block diagram of an exemplary computer system on which embodiments can be implemented.

FIG. 6 is a schematic diagram of an example computer system 600 used to implement embodiments of the STB 102, headend 101, data collection system 301, data collectors 108, data warehouse 110, and/or other systems. Various aspects of the various embodiments can be implemented by software, firmware, hardware, or a combination thereof. FIG. 6 illustrates an example computer system 600 in which an embodiment, or portions thereof, can be implemented as computer-readable code. Various embodiments are described in terms of this example computer system 600. After reading this description, it will become apparent to a person skilled in the relevant art how to implement embodiments using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612 and/or a removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a tangible computer readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (e.g., an Ethernet card), a communications port, a PCMCIA slot and card, or the like. Software and data transferred via communications interface 624 are provided to communications interface 624 via a communications path 626. Communications path 626 may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement embodiments as discussed herein, such as the system described above. In particular, the computer programs, when executed, enable processor 604 to implement the processes of embodiments. Accordingly, such computer programs represent controllers of the computer system 600. Where embodiments are implemented using software, the software may be stored in a computer program product and loaded into computer system 600 using removable storage drive 614, interface 620, hard drive 612 or communications interface 624.

Described above are systems, apparatuses, and methods for use of viewing data, and applications thereof. It is to be appreciated that the Detailed Description section, and not the Abstract, is intended to be used to interpret the claims. The Abstract may set forth one or more but not all exemplary embodiments of the present invention as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method, comprising:
receiving viewership data for a periodic event for a market segment from one or more of a plurality of set-top boxes in response to configuration files being transmitted to the one or more of the plurality of set-top boxes to configure the one or more of the plurality of set-top boxes to collect the viewership data for the periodic event, the periodic event being indicated as a repetitive event in a programming event calendar;
determining, from the viewership data, a tendency of the market segment to view the periodic event;
predicting viewership for a future occurrence of the periodic event based on the tendency of the market segment to view the periodic event;
evaluating past viewership data for one or more past occurrences of the periodic event to determine historical viewership for the periodic event;
comparing the predicted viewership for the future occurrence of the periodic event and the historical viewership for the periodic event to generate a confidence metric for the predicted viewership for the future occurrence of the periodic event;
identifying a time slot from among a plurality of time slots for which the predicted viewership for the future occurrence of the periodic event exceeds an advertising value threshold, the advertising value threshold being defined in terms of the predicted viewership for the future occurrence of the periodic event and the confidence metric; and
offering the time slot to an advertiser positioned to target the market segment.

2. The computer implemented method of claim 1, further comprising:
associating the historical viewership for the periodic event with a plurality of viewer characteristics; and
selecting a viewer characteristic from among the plurality of viewer characteristics to define the market segment.

3. The computer implemented method of claim 1, wherein the configuration files include collection rules configured to allow the one or more of the plurality of set-top boxes to opt-in for collection of the viewership data.

4. The computer implemented method of claim 1, wherein the determining comprises:
defining the tendency of the market segment to view the periodic event in relation to an affinity of the market segment to view the periodic event.

5. The computer implemented method of claim 4, wherein the affinity comprises:
a relative affinity reflecting minutes watched of the periodic event by the market segment relative to total minutes watched of all programs by the market segment; or
an absolute affinity reflecting minutes watched of the periodic event by the market segment relative to total potential minutes available to be watched of the periodic event by the market segment.

6. The computer implemented method of claim 1, wherein the determining comprises:
defining the tendency of the market segment to view the periodic event in relation to a correlation between minutes watched of the periodic event by the market segment and the market segment.

7. The computer implemented method of claim 1, wherein the predicting comprises:
determining a probability that the future occurrence of the periodic event will receive comparable viewership based on the determined tendency of the market segment to view the periodic event.

8. A headend with a service-provider managed network, the headend comprising:
a memory that stores instructions; and
a processor configured to execute the instructions, the instructions, when executed by the processor, configuring the processor to:
receive viewership data for a periodic event for a market segment from one or more of a plurality of set-top boxes in response to configuration files being transmitted to the one or more of the plurality of set-top boxes to configure the one or more of the plurality of set-top boxes to collect the viewership data for the periodic event, the periodic event being indicated as a repetitive event in a programming event calendar,
determine, from the viewership data, a tendency of the market segment to view the periodic event,
predict viewership for a future occurrence of the periodic event based on the tendency of the market segment to view the periodic event, evaluate past viewership data for one or more past occurrences of the periodic event to determine historical viewership for the periodic event;

compare the predicted viewership for the future occurrence of the periodic event and the historical viewership for the periodic event to generate a confidence metric for the predicted viewership for the future occurrence of the periodic event, identify a time slot from among a plurality of time slots for which the predicted viewership for the future occurrence of the periodic event exceeds an advertising value threshold, the advertising value threshold being defined in terms of the predicted viewership for the future occurrence of the periodic event and the confidence metric, and offer the time slot to an advertiser positioned to target the market segment.

9. The headend of claim 8, wherein the instructions, when executed by the processor, further configure the processor to:

associate the historical viewership for the periodic event with a plurality of viewer characteristics, and select a viewer characteristic from among the plurality of viewer characteristics to define the market segment.

10. The headend of claim 8, wherein the configuration files include collection rules configured to allow the one or more of the plurality of set-top boxes to opt-in for collection of the viewership data.

11. The headend of claim 8, wherein the instructions, when executed by the processor, configure the processor to:

define the tendency of the market segment to view the periodic event in relation to an affinity of the market segment to view the periodic event.

12. The headend of claim 11, wherein the affinity comprises:

a relative affinity reflecting minutes watched of the periodic event by the market segment relative to total minutes watched of all programs by the market segment; or an absolute affinity reflecting minutes watched of the periodic event by the market segment relative to total potential minutes available to be watched of the periodic event by the market segment.

13. The headend of claim 8, wherein the instructions, when executed by the processor, configure the processor to:

define the tendency of the market segment to view the periodic event in relation to a correlation between minutes watched of the periodic event by the market segment and the market segment.

14. The headend of claim 8, wherein the instructions, when executed by the processor, configure the processor to:

determine a probability that the future occurrence of the periodic event will receive comparable viewership based on the determined tendency of the market segment to view the periodic event.

15. A headend with a service-provider managed network, the headend comprising:

a memory that stores instructions; and a processor configured to execute the instructions, the instructions, when executed by the processor, configuring the processor to:

receive viewership data for a periodic event for a market segment from one or more of a plurality of set-top boxes in response to configuration files being transmitted to the one or more of the plurality of set-top boxes to configure the one or more of the plurality of set-top boxes to collect the viewership data for the periodic event, the periodic event being indicated as a repetitive event in a programming event calendar, determine, from the viewership data, a tendency of the market segment to view the periodic event, predict viewership for a future occurrence of the periodic event based on the tendency of the market segment to view the periodic event, evaluate past viewership data for one or more past occurrences of the periodic event to determine historical viewership for the periodic event, compare the predicted viewership for the future occurrence of the periodic event and the historical viewership for the periodic event to generate a confidence metric for the predicted viewership for the future occurrence of the periodic event, identify a time slot from among a plurality of time slots for which the predicted viewership for the future occurrence of the periodic event exceeds an advertising value threshold, the advertising value threshold being defined in terms of the confidence metric, and offer the time slot to an advertiser positioned to target the market segment.

16. The headend of claim 15, wherein the instructions, when executed by the processor, further configure the processor to:

associate the historical viewership for the periodic event with a plurality of viewer characteristics, and select a viewer characteristic from among the plurality of viewer characteristics to define the market segment.

17. The headend of claim 15, wherein the configuration files include collection rules configured to allow the one or more of the plurality of set-top boxes to opt-in for collection of the viewership data.

18. The headend of claim 15, wherein the instructions, when executed by the processor, configure the processor to:

define the tendency of the market segment to view the periodic event in relation to an affinity of the market segment to view the periodic event.

19. The headend of claim 15, wherein the instructions, when executed by the processor, configure the processor to:

define the tendency of the market segment to view the periodic event in relation to a correlation between minutes watched of the periodic event by the market segment and the market segment.

20. The headend of claim 15, wherein the instructions, when executed by the processor, configure the processor to:

determine a probability that the future occurrence of the periodic event will receive comparable viewership based on the determined tendency of the market segment to view the periodic event.

* * * * *